United States Patent
Core et al.

(10) Patent No.: US 6,804,518 B2
(45) Date of Patent: Oct. 12, 2004

(54) APPARATUS AND METHOD FOR PERFORMING FORCED REGISTRATION OF A MOBILE STATION AFTER HARD HANDOFF

(75) Inventors: Ronald Scott Core, Cave Creek, AZ (US); Lloyd J. Johnson, Scottsdale, AZ (US); Steven K. Turner, Cary, IL (US); James P. Peterson, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 581 days.

(21) Appl. No.: 09/955,325

(22) Filed: Sep. 18, 2001

(65) Prior Publication Data

US 2003/0054822 A1 Mar. 20, 2003

(51) Int. Cl.[7] .................................. H04Q 7/20
(52) U.S. Cl. .................. 455/436; 455/437; 455/439
(58) Field of Search ..................... 455/436, 437, 455/439, 452.1, 517, 414.1, 403, 553.1, 525

(56) References Cited

U.S. PATENT DOCUMENTS

2002/0082018 A1 * 6/2002 Coskun et al. ............... 455/439
2003/0232629 A1 * 12/2003 Jang et al. ................. 455/552.1

* cited by examiner

Primary Examiner—Melur Ramakrishnaiah
(74) Attorney, Agent, or Firm—Lalita W. Pace

(57) ABSTRACT

In a network supporting concurrent services, mobile terminated call delivery processing is simplified by an apparatus and method for forcing a Mobile Station (MS) (118) to register with a new Mobile Switching Center (MSC) (110) after a hard handoff has occurred. The mobile station registers with the new MSC when the mobile station is in an active data call, but not in an active voice call. The method momentarily sends the data session to dormant mode while the mobile station performs location updating. The method utilizes a new information element in a Clear Command message that allows the MSC to indicate to the Base Station Controller (112) that the period a data session must remain dormant should be very brief. This brief period of time limits the impact on the MS user.

9 Claims, 2 Drawing Sheets

APPARATUS AND METHOD FOR PERFORMING FORCED REGISTRATION OF A MOBILE STATION AFTER HARD HANDOFF

FIELD OF THE INVENTION

The present invention relates generally to the field of communication systems, and more particularly, to a method of routing a voice call to a mobile station that is engaged in a packet data call.

BACKGROUND OF THE INVENTION

The Code Division Multiple Access (CDMA) IS-2000 network supports concurrent services functionality (packet data and voice). In particular, a mobile station (MS) operating in the IS-2000 network may be in a state where it is engaged in a packet data call and simultaneously available for voice originations and terminations. If the MS has undergone an intersystem hard handoff (HHO) prior to entering this state or an intersystem HHO occurs while the MS is in this state, the MS will not register with its serving mobile switching center (MSC) as long as the data call remains active. When this occurs, delivery of mobile terminated voice calls to the MS is complex and may lead to excessive intersystem messaging. For example, an anchor MSC could send ANSI-41 intersystem setup messages to a list of MSCs that might be serving the MS to setup the call. Those not serving the MS would reply with a setup result of "unsuccessful". However, it is unclear how the MSC would determine the members of the list. FIG. 1 illustrates the problem of the delivery of mobile terminated voice calls after an intersystem HHO has occurred.

As shown in FIG. 1, the MS 118 is engaged in a packet data call with the PDSN 120. While the MS 118 is engaged in the data call, the originating MSC 102 receives a voice call attempt. The originating MSC 102 obtains the location of the MS 118 from the Home Location Register (HLR) 104 in the MS's home network. The HLR 104 obtains the circuit address, specifically the temporary local directory number, of the MS 118 from the anchor MSC 106 and a circuit bearer path (physical circuit that carries the bearer data) for the voice call is established to the anchor MSC 106. The anchor MSC 106 is the first MSC that the MS 118 registers with. The MS 118 receives access network management and control from the anchor MSC 106 via the Base Site Controller (BSC) 108 and Base Transceiver Station (BTS) 109. When the MS 118 undergoes an intersystem HHO, a different MSC shown as a first serving MSC 110 will begin "serving" the MS 118. The MS 118 will now receive access network management and control from the first serving MSC 110 via the BSC 112 and BTS 113. However, the MS 118 will not register with the first serving MSC 110 as long as the data call remains active. As designated by the dotted lines in FIG. 1, the anchor MSC 106 may not have the Signaling System 7 (SS7) address of the first serving MSC 110 and may not have a bearer path to deliver a voice call to the first Serving MSC 110. (The SS7 address is what the MSC uses to address signaling messages to other network elements.) Thus, the MS 118 will be unable to communicate with the first serving MSC 110 via the BSC 112 and BTS 113 for receipt of the voice call. The problem continues if yet another HHO occurs to a second serving MSC 114. Again, the anchor MSC 106 may not have the SS7 address of the second serving MSC 114 and may not have a bearer path to deliver a voice call to the second Serving MSC 114 via the BSC 116 and BTS 117. Currently, Chapter 5, Section 6 of Cellular Radiotelecommunications Intersystem Operations (ANSI/TIA/EIA-41-D), hereinafter referred to as ANSI-41, defines messaging that can overcome this problem for most mobile terminated voice call delivery scenarios. However, the messaging is complex and may not be available on all MSCs. A copy of ANSI-41 may be obtained via a world wide web site located at www.tiaonline.org, or by writing to Telecommunications Industry Association, 1300 Pennsylvania Ave., Suite 350, Washington, D.C. 20004 USA.

Thus, there is a need for a method of forcing a MS to re-register its location after an intersystem HHO without significantly impacting ongoing data sessions to eliminate the need for current complex processing. Such a method would allow routing of a voice call to the MS while the MS is engaged in a packet data session.

DETAILED DESCRIPTION OF THE DRAWINGS

The present invention provides a method of routing a voice call to a mobile station that is engaged in a packet data call. In particular, the method imitates commands that force a MS to re-register its location with its serving MSC after an intersystem HHO. In the preferred embodiment, the invention uses an ANSI-41 specified MSC/VLR, Motorola model number EMX2500 or EMX5000 to initiate the commands that force the mobile station to re-register. Preferably, the invention uses a CDMA BSC and a CDMA BTS to propagate the commands to the MS. Any MS compliant with the IS2000 CDMA standard can be used to implement the present invention. A BSC that can be used to implement the present invention is the 16.3 CBSC software/hardware release available from Motorola, Inc., Schaumburg, Ill. A BTS that can be used with the present invention is any Motorola CDMA BTS that runs the 16.3 release software.

The preferred embodiment of the present invention allows the serving MSC to clear a data call and momentarily send the associated data session to a dormant mode. This allows the MS to register with the serving MSC before resuming the data session. By keeping the period that the MS is in the dormant mode short, the registration can be accomplished without the MS user observing a significant interruption in the packet data session. Currently, when the serving MSC issues a Clear Command to the BSC, the packet data session may be forced to remain in dormant mode for a period defined by the BSC's internal dormant timer. In many BSC's the timer serves a variety of function, and in general is set to a value of several seconds to prevent rapidly repeating attempts to reestablish packet data service. If a value of several seconds were used with the method of the present invention, the resulting interruption in the packet data session would have an unacceptable impact on the subscriber. Thus, the method of the present invention introduces a new information element called "Short Dormant Indicator" in the definition for the Clear Command. This element serves as an indication to the BSC that the MS should remain in dormant mode for a short period. Preferably, the exact value of the dormant time is established by the BSC.

Figure 2:
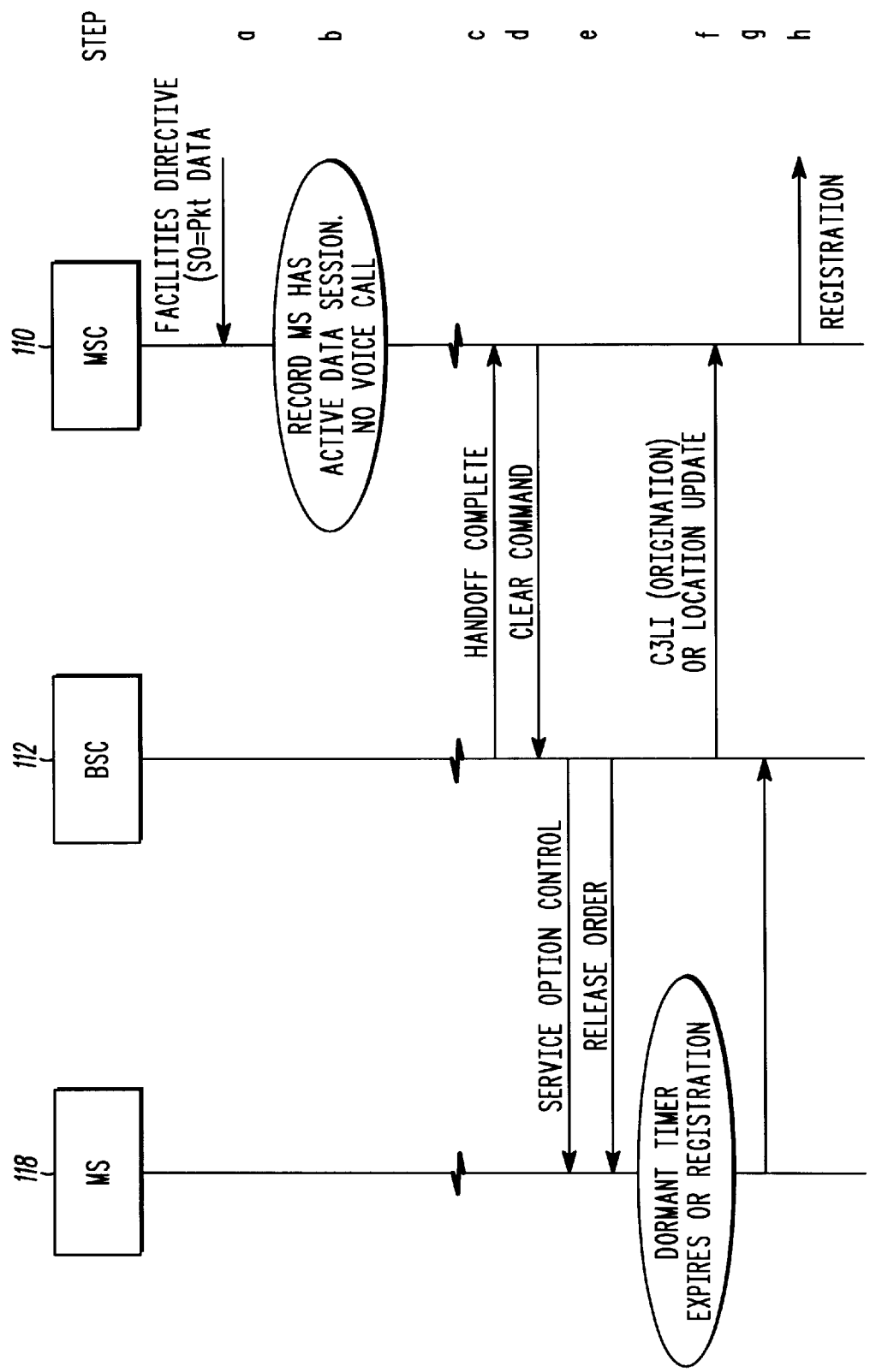
FIG. 2 is a flow diagram of a method of routing a voice call to a MS engaged in a packet data call in accordance with a preferred embodiment of the present invention.

In the preferred embodiment of the present invention, the method is distributed between the serving MSC and the BSC of the infrastructure. In the MSC, the invention is implemented by an EMX-V computer running software version J17.0. In the BSC, the invention is implemented by a Compaq Puma computer running the 16.3 version software. It should be recognized by one of ordinary skill in the art that the method may be implemented centrally within the infrastructure. The method forces the MS to register with the serving MSC, thereby allowing the serving MSC to forward voice calls to the MS when engaged in a packet data call. Referring to FIG. 2, details of the method will be described. At step a, the serving MSC 110 initiates the method when it determines that the MS 118 that has undergone an intersystem HHO has an active packet data session, but no voice call (Facilities Directive (SO=Pkt Data)). At step b, the MSC 110 records the fact that the MS 118 has an active packet session, but no active voice call. At step c, the MSC 110 receives notification from the BSC 112 that handoff is complete. At step d, the MSC 110 issues a Clear Command to the BSC 112 to clear the data call. In accordance with the preferred embodiment of the invention, the Clear Command includes the Short Dormant Indicator element to indicate to the BSC 112 that the MS 118 should remain dormant for a short period of time. The period of time could be very short, e.g., a few tenths of a second, which is at least one order of magnitude shorter than the default period set for the dormant timer used within the radio access network for other purposes. The Clear Command with the Short Dormant Indicator element causes the packet data session (i.e. MS 118) to transition from active to dormant mode. In an alternate embodiment, the Short Dormant Indicator element may include the period of time the MS 118 should remain dormant.

Figure 1:
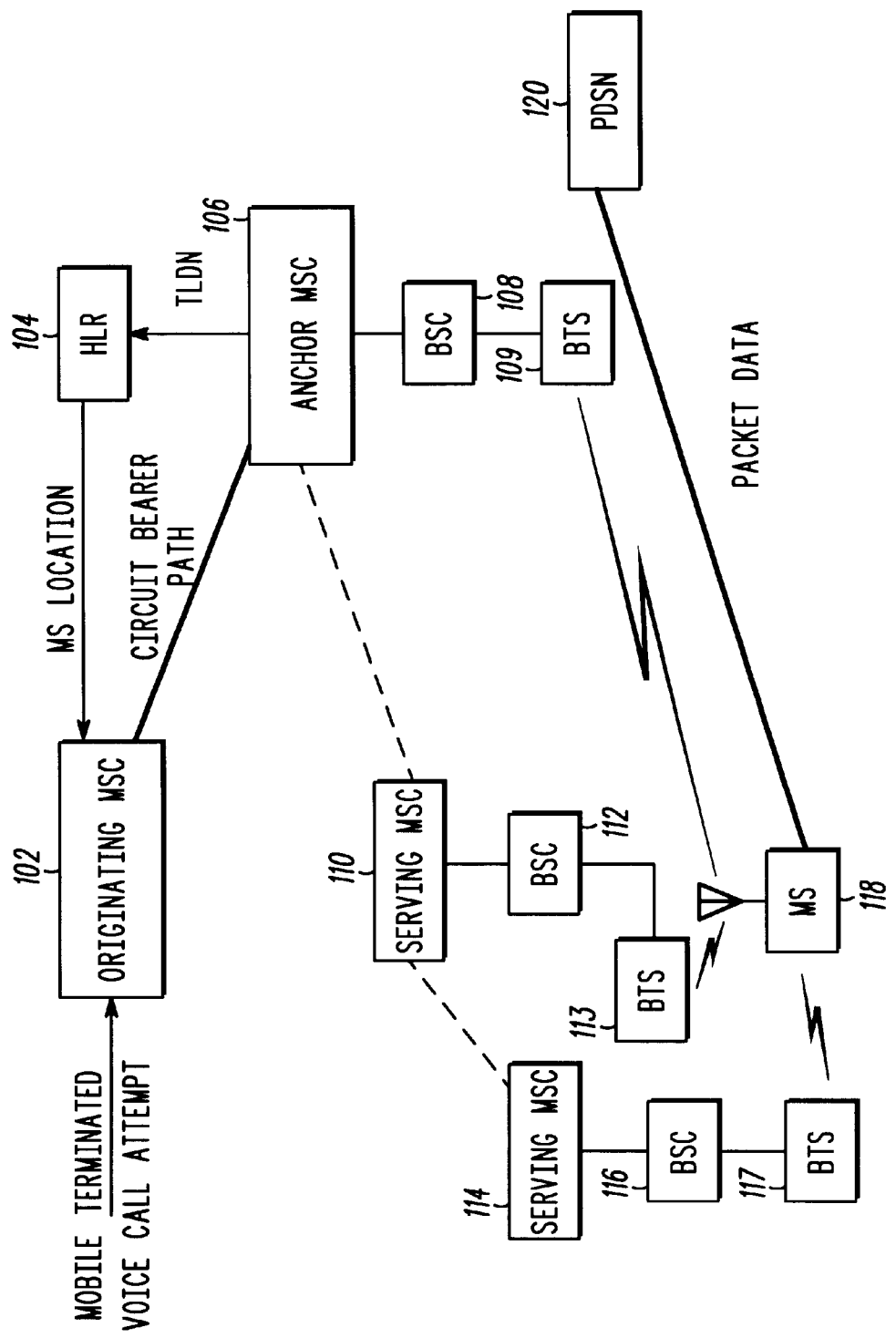
FIG. 1 is block diagram of a post hard handoff mobile station terminated voice call delivery scenario according to currently known methods.

When the BSC 112 receives the Clear Command with the Short Dormant Indicator element, it sends a Service Option Control Message to the MS 118 (through the BTS 113 in FIG. 1) containing the period of time that the MS 118 must remain dormant (step e). At step f, the BSC 112 immediately follows the Service Option Control Message with a Release Order to free the radio resources being used by the packet call. With the data call cleared, the MS 118 immediately begins monitoring the control channel. Once, the MS 118 realizes it has moved into a new area, it will register with the network (new serving MSC 110) and its location will be updated (steps g and h). The new MSC 110 can then use this location information to route an incoming voice call to the MS 118.

If the MS 118 has data to send, it may attempt to originate a new data call before registering with the network. This will not cause a problem, however, because receipt of such an origination by the MSC 110 will result in an implicit registration. In either case, the MS 118 will be registered in its new location and the network will be able to deliver voice calls to the MS 118. Given the bursty nature of packet data and the short period of time in which the MS 118 is forced into dormant, the clearing of the data call and subsequent re-initiation of the data call should be virtually unnoticeable to the MS user.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. In a communication system infrastructure, a method of routing an incoming voice call to a mobile station involved in an active packet data session comprising the steps of:

determining that the mobile station has undergone a hard handoff;
sending a command to cause the mobile station to transition from active mode to dormant mode, wherein the command includes an indicator that the mobile station should remain in dormant mode for a short period of time;
receiving notification that the mobile station has registered its location; and
routing the voice call to the mobile station at the location.

2. The method of claim 1 wherein the step of determining that the mobile station has undergone a hard handoff comprises receiving a Handoff Complete message.

3. The method of claim 1 wherein the step of sending a command to cause the mobile station to transition from active mode to dormant mode comprises sending a period of time that the mobile station should remain dormant.

4. The method of claim 1 wherein after the step of sending a command to cause the mobile station to transition from active mode to dormant mode, the method comprises the step of sending a message to the mobile station specifying the period of time that the mobile station should remain dormant.

5. The method of claim 4 wherein after the step of sending a message to the mobile station specifying the period of time that the mobile station should remain dormant, the method comprises the step of sending a message to the mobile station to free radio resources being used by the packet data session.

6. In a mobile station engaged in an active packet data session, a method of receiving a voice call after the mobile station has undergone a hard handoff, the method comprising:

receiving a message instructing the mobile station to transition from active mode to dormant mode, wherein the message comprises an amount of time that the mobile station should remain in dormant mode;
registering a new location of the mobile station; and
receiving the voice call at the new location.

7. The method of claim 6 wherein after the step of receiving a message instructing the mobile station to transition from active mode to dormant mode, the method includes the step of receiving a message instructing the mobile station to free radio resources being used by the packet data session.

8. The method of claim 6 wherein after the step of registering a new location of the mobile station, the method comprises the step of transitioning from dormant mode to active mode.

9. An apparatus for routing an incoming voice call to a mobile station involved in an active packet data session comprising:

a mobile switching center
determining that the mobile station has undergone a hard handoff
sending a command to cause the mobile station to transition from active mode to dormant mode, wherein the command includes an indicator that the mobile station should remain in dormant mode for a short period of time
receiving notification that the mobile station has registered its location; and
routing the voice call to the mobile station at the location; and
a base station controller
sending a message to the mobile station specifying the period of time that the mobile station should remain dormant
sending a message to the mobile station to free radio resources being used by the packet data session.

* * * * *